United States Patent [19]

Fabre et al.

[11] Patent Number: 4,758,412
[45] Date of Patent: Jul. 19, 1988

[54] PRODUCTION OF RARE EARTH HYDROXIDES FROM PHOSPHATE ORES

[75] Inventors: Frederic Fabre, Paris; Andre Lambert, Louvres; Jean-Paul Tognet, La Rochelle, all of France

[73] Assignee: Rhone-Poulenc Specialites Chimiques, Courbevoie, France

[21] Appl. No.: 928,546

[22] Filed: Nov. 10, 1986

[30] Foreign Application Priority Data

Nov. 8, 1985 [FR] France ................. 85 16542

[51] Int. Cl.⁴ ............................................. C01F 17/00
[52] U.S. Cl. ................................... 423/21.1; 423/263
[58] Field of Search ........................... 423/21.1, 263

[56] References Cited

U.S. PATENT DOCUMENTS

| | | |
|---|---|---|
| 2,783,125 | 2/1957 | di Rohden et al. ............. 423/263 |
| 2,811,411 | 10/1957 | Calkins ............................ 423/21.1 |
| 2,815,264 | 12/1957 | Calkins et al. .................. 423/263 |
| 2,995,420 | 8/1961 | Duncan et al. .................. 423/21.1 |
| 3,049,403 | 8/1962 | Krumholz et al. .............. 423/21.1 |
| 3,763,050 | 10/1973 | Dikhoff et al. ................. 423/21.1 |

FOREIGN PATENT DOCUMENTS 415882 6/1936 Belgium .
2084556 4/1982 United Kingdom ............ 423/263

OTHER PUBLICATIONS

Meerson, "More Rapid Method for Extraction of Thorium and Rare Earths from Monazite by Alkali Treatment", UDC 669.2/8.094, pp. 20–22.
Chemical Abstracts, vol. 92, No. 18, May 1980, p. 153, Resume No. 149341u.

Primary Examiner—Patrick P. Garvin
Assistant Examiner—Paige C. Harvey
Attorney, Agent, or Firm—Burns, Doane, Swecker & Mathis

[57] ABSTRACT

The rare earth hydroxides are improvedly prepared by (i) treating a rare earth phosphate mineral, e.g., monazite or xenotime, with an aqueous solution of an alkali metal hydroxide, (ii) separating therefrom rare earth hydroxide solids and a liquid phase essentially consisting of alkali metal phosphate and alkali metal hydroxide, (iii) crystallizing alkali metal phosphate from said liquid phase, (iv) separating the mother liquor of crystallization therefrom which contains said alkali metal hydroxide, (v) adding calcium oxide or hydroxide to the mother liquor thus separated to form a precipitate therein, (vi) separating said formed precipitate, and (vii) recycling the mother liquor of separation to said treatment step (i).

19 Claims, 1 Drawing Sheet

4,758,412

PRODUCTION OF RARE EARTH HYDROXIDES FROM PHOSPHATE ORES

BACKGROUND OF THE INVENTION

1. Field of the Invention

The present invention relates to the treatment of minerals containing rare earth phosphates, such as monazite or xenotime, and, more especially, to an improved process for the production of rare earth hydroxides by such treatment of minerals containing rare earth phosphates.

2. Description of the Prior Art

The industrial processes for the production of rare earth hydroxides by the treatment of minerals containing rare earth phosphates typically consist of grinding the mineral very thoroughly and severely, either dry or in an aqueous medium, treating the ground mineral with a concentrated aqueous solution of sodium hydroxide at an elevated temperature, and then separating, in heated state and after dilution, a solid phase consisting of the rare earth hydroxides and a liquid phase consisting of a concentrated aqueous solution essentially consisting of sodium hydroxide and sodium phosphate.

The liquid phase is then optionally concentrated and the crystallization of sodium phosphate $Na_3PO_4 \cdot 10\ H_2O$ is initiated.

The sodium phosphate crystals are then separated and a solution relatively rich in sodium hydroxide, designated the crystallization mother liquor, is recovered. This solution contains, for example:

| | |
|---|---|
| (i) 3 to 6 N sodium hydroxide | 120 to 240 g/l |
| (ii) $P_2O_5$ | 1 to 10 g/l |
| (iii) $SiO_2$ | 3 to 6 g/l |

It has been proposed to this art to recycle this solution to decompose the minerals, optionally after concentration. However, silica (in the form of a silicate) tends to accumulate over the course of the recycling (U.S. Pat. No. 2,815,264). For this reason, it is specified that approximately one-half of the solution recovered after separation of the sodium phosphate is recycled.

The assignee hereof has now determined that the major disadvantage of the accumulation of silica over the course of such recycling has been a reduction in the yield of the rare earth hydroxides. Means have now been developed to eliminate the silica from the product solution.

SUMMARY OF THE INVENTION

Accordingly, a major object of the present invention is the provision of an improved process for the treatment of the liquid phase emanating from the production of the rare earth hydroxides, to avoid the accumulation of silica therein.

Briefly, the present invention features treating such liquid phases with an alkaline earth oxide or hydroxide, and thence separating therefrom the precipitate which results.

BRIEF DESCRIPTION OF THE DRAWING

The Figure of Drawing is a schematic of suitable process/apparatus for carrying out the present invention.

DETAILED DESCRIPTION OF THE PREFERRED EMBODIMENTS OF THE INVENTION

Figure 1:
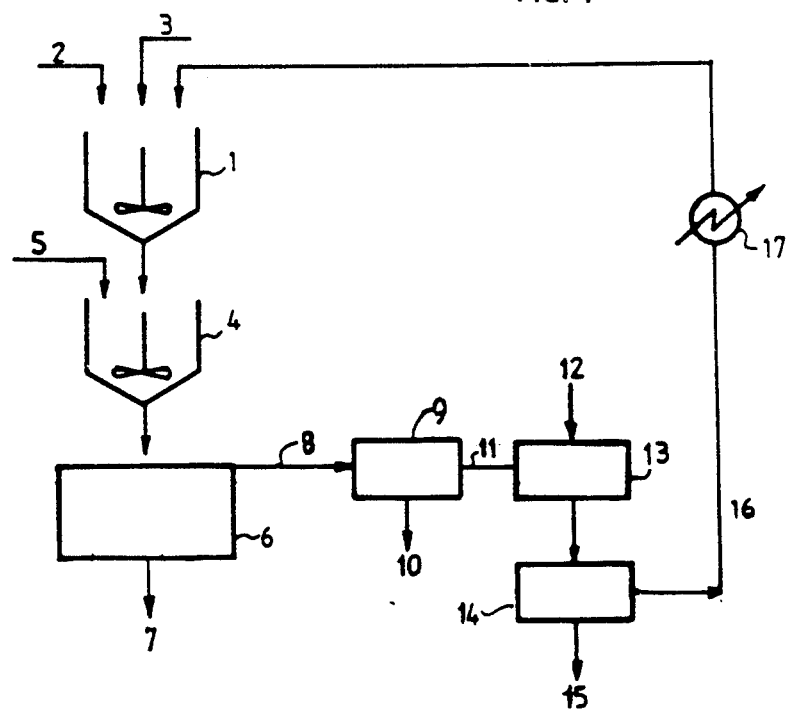

More particularly according to the present invention, it was already known to this art, in a process for the treatment of monazite, to treat the liquid phase with lime [G. A. Meerson and Li Man Khek, *Russ Met.*, p. 22 (1965) and British Pat. No. 2,084,556]. However, this process relates to the treatment of a solution directly separated from the rare earth hydroxides, i.e., a solution containing sodium phosphate and sodium hydroxide. In such process, all of the sodium phosphate is converted into calcium phosphate, which is precipitated. The prior art does not suggest a treatment after the separation of the sodium phosphate and does not face the problem caused by the accumulation of silica.

Contrariwise, the present invention provides an improved process for the production of rare earth hydroxides by (i) treating a mineral containing rare earth phosphates with an aqueous solution of a hydroxide of an alkali metal, (ii) separating a solid phase comprising the rare earth hydroxide and a liquid phase essentially consisting of the phosphate of the alkali metal and the hydroxide of the alkali metal, (iii) crystallizing the alkali metal phosphate from said liquid phase, which in turn is separated from its mother liquor of crystallization essentially consisting of the hydroxide of the alkali metal, after which the mother liquid is (iv) recycled, optionally after concentration, to the mineral treatment step, and said improvement being characterized in that, prior to the recycling, an alkaline earth metal oxide or hydroxide, most preferably calcium oxide or hydroxide, is added to the crystallization mother liquor of the phosphate of the alkali metal, and the precipitate formed is separated from the solution, which is then recycled.

The subject process enables the total recirculation of the hydroxide of the alkali metal present in the solution recovered after separation of the alkali metal phosphate, in contrast to the known method wherein only one-half of the alkali metal hydroxide could be recycled. Such recycling does not result in a reduction in the yield from the decomposition of the rare earth phosphates.

The treatment according to this invention makes it possible not only to eliminate the silica, but also all of the phosphate remaining in the solution, i.e., the phosphate that has not crystallized in the crystallization stage, together with other impurities, alumina (in aluminate form), for example.

All of the rare earth minerals used in the process of the invention are phosphate ores containing the rare earths, in particular monazite and xenotime. However, any synthetic residue containing rare earth phosphates may also be treated consistent herewith.

By "rare earths" according to the invention are intended those elements of the Periodic Table having atomic numbers ranging from 57 to 71, and yttrium, which has an atomic number of 39. The rare earth minerals treated according to the process of the invention may contain these elements in widely varying amounts The rare earth minerals used in the process of the invention are preferably minerals which have been at least coarsely ground. But unground minerals and ores may also be used, if their particle sizes are sufficiently fine.

The grinding may be carried out in conventional manner, dry or in water.

The ground mineral is then treated hot with a concentrated aqueous solution of an alkali metal hydroxide, resulting in a pulp or slurry.

The alkali metal hydroxide may be sodium hydroxide, potassium hydroxide or mixture thereof. The preferred hydroxide is sodium hydroxide. It is employed in the form of a concentrated aqueous solution having a concentration ranging from 30 to 70% by weight. A solution containing from 45 to 50% by weight of the alkali metal hydroxide is preferably used.

The alkali attack requires a large excess of the alkali metal hydroxide. Generally, 1.5 to 3 times the stoichiometric amount is used, depending upon the particular minerals and the mode of decomposition.

The conditions of the treatment may be the same as those used in the known processes. Thus, the temperature may range from 100° to 220° C., preferably from 130° to 180° C. and the pressure from atmospheric to $3 \times 10^6$ Pa. The duration of the treatment, which is a function of the temperature and pressure, may range from 1 to 10 hr. In addition, vigorous agitation of the reaction medium is necessary during this stage of the attack.

Following this attack, the pulp or slurry is diluted with water, for example, to approximately 5 to 25% of the alkali metal hydroxide, and the precipitated rare earth hydroxide is separated by known methods, such as filtration, decantation, dehydration or centrifugation.

The recovered liquid phase essentially consists of the alkali metal phosphate and the alkali metal hydroxide.

In this optionally concentrated phase, the crystallization of the alkali metal phosphate is initiated, for example, by cooling to a temperature most typically ranging from 15° to 35° C. and the crystals of the alkali metal phosphate are then separated in a conventional manner.

The mother liquor of the crystallization of the alkali metal phosphate, containing the alkali metal hydroxide and the impurities to be eliminated, is recovered. It therefore essentially comprises the alkali metal hydroxide, the concentration of which may vary from 1 to 8 N.

Consistent with the characterizing feature of the present invention, the mother liquor of crystallization is then treated with a calcium oxide or hydroxide.

Such calcium oxide or hydroxide is conventionally designated as "lime".

According to the invention, the lime may be used in a more or less finely ground form and, while an aqueous form is not without the scope of the invention, such embodiment requires ultimate elimination of the added water.

The calcium oxide or hydroxide is advantageously used in a stoichiometric ratio of 1 to 3, preferably 1.5 to 2.5, in particular approximately 2, this ratio being calculated with respect to the $PO_4^{3-}$ and $SiO_3^{2-}$ ions on the basis of the following reactions:

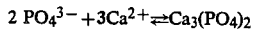

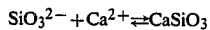

The calcium oxide or hydroxide is introduced into the mother liquor, the temperature of which is not critical and may range from ambient to the boiling temperature, but preferably ranges from 70° to 90° C., in particular approximately 80° C.

The addition of the calcium oxide or hydroxide may be carried out continuously or discontinuously, progressively or in a single batch. Upon completion of such addition, the reaction medium is maintained under agitation for a certain period of time prior to the separation operation.

The period of time between the addition of the calcium oxide or hydroxide and the separation of the precipitate by a discontinuous process, or the retention time in a continuous process, may also vary over wide limits, for example, from 10 min to 10 hr, but advantageously ranges from 1 to 3 hr.

The precipitate obtained, containing the impurities to be eliminated (silicate, phosphate) is separated from the reaction medium by conventional liquid/solid separation methods: filtration, decantation, dehydration and centrifugation.

The liquid phase includes the alkali metal hydroxide solution which may be recycled to the mineral treatment parameter of the subject process.

It is possible, if necessary, to concentrate the solution prior to recycling.

The process according to the invention permits the recycling of the alkali metal hydroxide solution in the absence of reduction in the yield of the rare earth hydroxides.

To facilitate understanding of the invention, a preferred embodiment thereof is shown in the accompanying Figure of Drawing.

Into a reactor 1, a ground mineral 2 containing rare earth phosphates is introduced, together with fresh sodium hydroxide 3.

After the reaction, the reaction product is diluted in reactor 4 by addition of water 5 thereto.

Following dilution, the precipitate of the rare earth hydroxides is separated in separator 6.

The rare earth hydroxides are recovered via line 7 and a liquid phase essentially consisting of sodium phosphate and sodium hydroxide is collected via line 8.

Sodium phosphate is separated from said liquid phase by crystallization in crystallizer 9. Sodium phosphate is recovered via line 10 and the mother liquid of the crystallization of sodium phosphate is collected via line 11.

According to the invention, in precipitation tank 13 a calcium oxide or hydroxide 12 is added to the mother liquid.

The precipitate recovered via line 15 formed in the precipitation tank 13 is separated in separator 14. The liquid solution in from the precipitation tank 13 may be concentrated in heat exchanger 17 prior to being recycled back into the reactor 1. In order to further illustrate the present invention and the advantages thereof, the following specific examples are given, it being understood that same are intended only as illustrative and in nowise limitative.

EXAMPLE 1

6 m³ of the mother liquor obtained after the crystallization of sodium phosphate were treated. The mother liquor contained (the impurities are expressed as the oxides thereof):

(i) 936 kg of free NaOH (or 156 g/l)
(II) 45 kg $P_2O_5$
(iii) 76 kg NaOH, bonded in the phosphate form
(iv) 19 kg $SiO_2$ (or 3.17 g/l)
(v) 5 kg $Al_2O_3$.

To the mother liquor at 80° C., 142 kg CaO lime were added (a stoichiometric ratio of 2).

The solution was permitted to stand, under agitation, for two hours and the precipitate was then filtered and washed with water.

An aqueous solution in a volume of 5.8 m3 and containing 1000 kg NaOH, 2.5 kg SiO$_2$, 4 kg Al$_2$O$_3$ and depleted in phosphate, was obtained.

EXAMPLE 2

A series of successive experiments simulating the process according to the invention was carried out, the treatment of the mother liquor of crystallization of the sodium phosphate with lime being at 80° C. for 2 hr. The lime was introduced in a manner such that the stoichiometric ratio was approximately 2. It was found that the concentration in P$_2$O$_5$, Al$_2$O$_3$, SiO$_2$ rapidly became constant in the mother liquor of crystallization in the course of the different experiments.

The following yields of rare earth hydroxide were obtained:

| Experiment | 1* | 2 | 3 | 4 | 5 |
|---|---|---|---|---|---|
| Yield | 96.7 | 96.4 | 97.5 | 96.9 | 96.5 |

*first experiment without recycling

These results demonstrate the possibility of total recycling of sodium hydroxide after the treatment with lime.

COMPARATIVE EXAMPLE

The process was carried out as in Example 2, but without the lime treatment. The yields of rare earth hydroxide were as follows:

| Experiment | 1* | 2 | 3 | 4 | 5 |
|---|---|---|---|---|---|
| Yield | 97.0 | 93.6 | 94.3 | 93.8 | 93.5 |

*first experiment without recycling

These results demonstrate the loss in yield resulting from recycling, if no treatment with lime is included.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the simultaneous production of a rare earth hydroxide and an alkali phosphate, comprising (i) treating a rare earth phosphate mineral containing as an impurity a silicate compound, with an aqueous solution of an alkali metal hydroxide, (ii) separating therefrom rare earth hydroxide and forming a liquid phase which includes alkali metal phosphate and alkali metal hydroxide, (iii) crystallizing alkali metal phosphate from said liquid phase, (iv) recovering said alkali metal phosphate by separating the mother liquor of crystallization therefrom which contains said alkali metal hydroxide, and said impurities, (v) adding alkaline earth metal oxide or hydroxide to the mother liquor thus separated to form a precipitate therein, said precipitate including alkaline earth metal phosphates and alkaline earth metal silicates, (vi) separating said formed precipitate, and (vii) recycling substantially all of the mother liquor of separation to said treatment step (i), said recycling mother liquor being substantially free of silicates.

2. The process as defined by claim 1 wherein said alkaline earth metal is calcium.

3. The process as defined by claim 1, further comprising concentrating the mother liquor of separation prior to said recycling (vii).

4. The process as defined by claim 1, wherein the concentration of alkali metal hydroxide in said mother liquor of crystallization ranges from 1 to 8 N.

5. The process as defined by claim 4, said concentration ranging from 3 to 6 N.

6. The process as defined by claim 1, said mother liquor of crystallization comprising from 1 to 10 g/l of P$_2$O$_5$.

7. The process as defined by claim 1, said mother liquor of crystallization comprising from 3 to 6 g/l of SiO$_2$.

8. The process as defined by claim 2, comprising adding said calcium oxide or hydroxide in a ratio of stoichiometric excess of from 1 to 3, relative to the PO$_4{}^{3-}$ and SiO$_3{}^{2-}$ ions present.

9. The process as defined by claim 8, said ratio of stoichiometric excess ranging from 1.5 to 2.5.

10. The process as defined by claim 2, wherein the temperature of the mother liquor to which said calcium oxide or hydroxide is added ranges from ambient to boiling.

11. The process as defined by claim 10, said temperature ranging from 70° to 90° C.

12. The process as defined by claim 11, said temperature being approximately 80° C.

13. The process as defined by claim 2, wherein a period of time of from 10 min to 10 hr elapses between the addition of said calcium oxide or hydroxide and the separation of said formed precipitate.

14. The process as defined by claim 2, carried out continuously, and comprising holding the separated mother liquor to which said calcium oxide or hydroxide has been added for a retention time of from 10 min to 10 hr prior to separating the formed precipitate therefrom.

15. The process as defined by claim 13, said time period ranging from 1 to 3 hr.

16. The process as defined by claim 14, said retention time ranging from 1 to 3 hr.

17. The process as defined by claim 1, said rare earth phosphate mineral comprising particulate monazite or xenotime.

18. The process as defined by claim 1, wherein the aqueous solution of alkali metal hydroxide in step (i) has a concentration of 30 to 70% by weight.

19. The process as defined by claim 1, wherein the treated mineral is diluted with water prior to said separation step (ii).

* * * * *